(12) United States Patent
Hu et al.

(10) Patent No.: US 10,070,633 B2
(45) Date of Patent: Sep. 11, 2018

(54) OTTER BOARD

(71) Applicants: TOKYO UNIVERSITY OF MARINE SCIENCE AND TECHNOLOGY, Tokyo (JP); NICHIMO CO., LTD., Tokyo (JP)

(72) Inventors: Fuxiang Hu, Koto-ku (JP); Tadashi Tokai, Yokohama (JP); Hiromi Kinoshita, Shinagawa-ku (JP); Taisei Kumazawa, Shinagawa-ku (JP)

(73) Assignees: TOKYO UNIVERSITY OF MARINE SCIENCE AND TECHNOLOGY, Minato-ku (JP); NICHIMO CO., LTD, Shinagawa-ku (JP)

( * ) Notice: Subject to any disclaimer, the term of this patent is extended or adjusted under 35 U.S.C. 154(b) by 697 days.

(21) Appl. No.: 14/550,317

(22) Filed: Nov. 21, 2014

(65) Prior Publication Data

US 2015/0075056 A1    Mar. 19, 2015

Related U.S. Application Data

(62) Division of application No. 13/201,198, filed as application No. PCT/JP2010/051961 on Feb. 10, 2010, now Pat. No. 8,943,736.

(30) Foreign Application Priority Data

Feb. 12, 2009  (JP) ................. 2009-030508

(51) Int. Cl.
*A01K 73/045* (2006.01)
*B63B 21/66* (2006.01)

(52) U.S. Cl.
CPC ............ *A01K 73/045* (2013.01); *B63B 21/66* (2013.01)

(58) Field of Classification Search
CPC ..................................... A01K 73/05
See application file for complete search history.

(56) References Cited

U.S. PATENT DOCUMENTS 2,523,925 A * 9/1950 Sorensen ............... A01K 73/05
                                                                    43/9.1
2,622,362 A * 12/1952 Jensen ................. A01K 73/05
                                                                    43/43.13

(Continued)

FOREIGN PATENT DOCUMENTS

GB    2147182 A    5/1985
GB    2174881 A    11/1986

(Continued)

OTHER PUBLICATIONS

Office Action dated Dec. 5, 2017 to Japanese Patent Application No. 2016-170581.

*Primary Examiner* — Christopher P Ellis
(74) *Attorney, Agent, or Firm* — Norton Rose Fulbright US LLP

(57) ABSTRACT

The invention has a curved board. The curved board is formed into a shape that curves in a curving direction corresponding to an expanding direction of a net opening in a towing state, from a front-side end section that is a front side in a towing direction in the towing state towards a rear-side end section that is a rear side in the towing direction in the towing state. At least one of a projecting structure having a projecting surface, a top board, and a bottom board is formed in the curved board.

4 Claims, 4 Drawing Sheets

(56) References Cited

U.S. PATENT DOCUMENTS

| | | | |
|---|---|---|---|
| 3,247,612 A | | 4/1966 | Luketa |
| 3,281,980 A | * | 11/1966 | Luketa .................. A01K 73/045 |
| | | | 43/9.7 |
| 3,299,560 A | | 1/1967 | Luketa |
| 4,180,935 A | * | 1/1980 | Goudey ............... A01K 73/045 |
| | | | 43/9.7 |
| 4,894,946 A | | 1/1990 | Fukushima |
| 5,265,367 A | * | 11/1993 | Kinoshita .............. A01K 73/05 |
| | | | 43/43.13 |
| 5,267,408 A | * | 12/1993 | Kinoshita .............. A01K 73/04 |
| | | | 43/9.7 |
| 5,283,972 A | * | 2/1994 | Kinoshita ............ A01K 73/045 |
| | | | 43/43.13 |
| 6,000,167 A | * | 12/1999 | Bowman ................ A01K 91/08 |
| | | | 43/43.13 |
| 6,131,327 A | | 10/2000 | Larsen |
| 8,943,736 B2 | * | 2/2015 | Hu ....................... A01K 73/045 |
| | | | 43/9.7 |
| 2008/0022913 A1 | * | 1/2008 | Toennessen ........... A01K 73/05 |
| | | | 114/245 |
| 2010/0126057 A1 | | 5/2010 | Safwat |

FOREIGN PATENT DOCUMENTS

| | | |
|---|---|---|
| JP | 50-71489 A | 6/1975 |
| JP | 61-193766 A | 12/1986 |
| JP | 2007-244215 A | 9/2007 |
| WO | 2008/129068 A1 | 10/2008 |

\* cited by examiner

OTTER BOARD

This application is a divisional of U.S. patent application Ser. No. 13/201,198, which is a National Phase of International Appl. No. PCT/JP2010/051961, the entire contents of all of which are hereby incorporated in their entirety by reference.

TECHNICAL FIELD

The present invention relates to a high-lift otter board. In particular, the present invention relates to a high-lift otter board suitable for spreading a trawl net.

BACKGROUND ART

In a trawl fishing method using a trawl net, appropriate spreading of the trawl net is important from the perspective of increasing exploitation rate and maintaining the quality of fishes that are caught. Therefore, since the past, an otter board is used as a means for spreading the trawl net in the trawl fishing method.

In general, the otter board is disposed in a position between a trawler and a trawl net. The otter board is towed by the trawler in a state in which the otter board is connected to the trawler with a towing rope (warp) set out from the trawler therebetween, and connected to the trawl net with an otter pennant therebetween. In accompaniment with the otter board being towed, a net opening of the trawl net is expanded.

Here, since the past, in the otter board, a vortex referred to as a wingtip vortex generated in an end section of the otter board during towing and an increase in resistance obstructing towing of the trawl net as a result of separation of flow at a front edge of a back surface of the otter board have been considered problems.

To solve the above-described problems, otter boards such as those described in Patent Literature 1 and Patent Literature 2 have been proposed in the past.

In other words, in Patent Literature 1, reduction of vortexes is attempted by flow boards being provided in the upper and lower ends of a main body of an otter board.

In Patent Literature 2, reduction of vortexes is attempted by a rectifying fin being provided on a front edge of a back surface of a main body of a vertical otter board, the rectifying fin successively widening towards the rear of the otter board main body in a traveling direction.

Patent Literature 1: Japanese Utility Model Laid-open Publication No. Showa 50-71489

Patent Literature 2: Japanese Utility Model Laid-open Publication No. Showa 61-193766

DISCLOSURE OF INVENTION

Problem to be Solved by the Invention

However, in the otter boards described in Patent Literature 1 and Patent Literature 2, force for spreading the trawl net cannot be increased.

Therefore, the present invention has been achieved in light of the above-described issues. An object of the present invention is to provide an otter board capable of significantly improving spreading force of a trawl net and achieving spreading force that is similar to or greater than that of a conventional otter board even when an area of the otter board is decreased.

Means for Solving Problem

To achieve the above-described object, an otter board of the present invention is an otter board that expands a net opening of a trawl net by being towed together with the trawl net by a trawler in a state in which the otter board is connected to the trawler and the trawl net. The otter board has a curved board that moves in an expanding direction of the net opening in accompaniment with towing by the trawler. The curved board is formed into a shape curving in a curving direction corresponding to the expanding direction of the net opening from a front-side end section that is a front side in a towing direction in a towing state towards a rear-side end section that is a rear side in the towing direction in the towing state. The otter board includes at least one of: a projecting structure formed on a surface of the curved board on a curving direction side over a region of a predetermined area on the front side on the surface on the curving direction side, the projecting structure having a projecting surface that projects further outward than the region of the predetermined area; a top board formed in an upper-side end section that is a vertical upper side of the curved board in the towing state, such as to extend in relation to the upper-side end section in the curving direction and a direction opposing the curving direction, in which an extension width of the top board in the curving direction in a section corresponding to the region of the predetermined area is the same or greater than an extension width of the top board in the curving direction in a section other than the section corresponding to the region of the predetermined area; and a bottom board formed in a lower-side end section that is a vertical lower side of the curved board in the towing state, such as to extend in relation to the lower-side end section in the curving direction and a direction opposing the curving direction, in which an extension width of the bottom board in the curving direction in a section corresponding to the region of the predetermined area is the same or greater than an extension width of the bottom board in the curving direction in a section other than the section corresponding to the region of the predetermined area.

According to a configuration such as that described above, because vortexes generated in the otter board can be sufficiently reduced by the projecting structure, spreading force of the trawl net can be sufficiently improved. Alternatively, the spreading force can be increased by increase in pressure difference in the end sections by the top board, while leaving wingtip vortexes in the end sections. Alternatively, the spreading force can be increased by increase in pressure difference in the end sections by the bottom board, while leaving wingtip vortexes in the end sections.

The present invention can further improve spreading force from that of a conventional otter board, as a result of the projecting shape of the rear surface (in other words, the surface on the curving direction side of the curved board) of the otter board such as that described above and the effects of both the top board and the bottom board.

The region of the predetermined area may be a region from the front-side end section on the surface on the curving direction side to an intermediate position between the front-side end section and a rear-side end section on the surface on the curving direction side. According to a configuration such as this, the formation area of the projecting structure can be set to an area suitable for suppressing separation of flow.

Furthermore, the projecting surface may be formed such that a section in a certain area on the front side is formed into a curved surface that curves in a projecting direction from the front-side end section side of the projecting surface towards the rear-side end section side of the projecting surface, and a section other than the section of the certain area is formed into a flat surface. According to a configuration such as this, the shape of the projecting surface can be that suitable for reducing separation of flow and reducing generation of vortexes.

Still further, the projecting structure may be composed of a plate-shaped member fixed onto the region of the predetermined area. According to a configuration such as this, the projecting structure can be simply formed.

The bottom board is preferably formed into a same shape as the top board.

Effect Of the Invention

According to the otter board of the present invention, spreading force of a trawl net can be significantly improved.

EXPLANATIONS OF LETTERS OR NUMERALS

BEST MODE(S) FOR CARRYING OUT THE INVENTION

An embodiment of an otter board of the present invention will hereinafter be described in detail with reference to FIG. 1 to FIG. 8.

The otter board according to the present embodiment is formed such as to be towed together with a trawl net by a trawler, in a state in which the otter board is connected to the trawler and the trawl net, thereby expanding the net opening of the trawl net.

In other words, FIG. 1 to FIG. 4 show a port-side otter board connected to the port side of the trawler as an otter board 1 according to the present embodiment. The otter board 1 has a curved board 2 capable of being moved in the expanding direction of the net opening of the trawl net in accompaniment with the towing by the trawler. The curved board 2 is formed having a shape in which a planar shape curving in a curving direction (an upward direction in FIG. 1 to FIG. 3, and a downward direction in FIG. 4) corresponding with the expanding direction of the net opening of the trawl net appears as an arc from a front-side end section (a right end side in FIG. 1 to FIG. 4) that is a front side in the towing direction in a towing state towards a rear-side end section (a left end section in FIG. 1 to FIG. 4) that is a rear side in the towing direction in the towing state. Here, "corresponding with the expanding direction" indicates that a correspondence exists between the curving direction and the expanding direction of the net opening, such that the curved board 2 moves in the expanding direction of the net opening by water pressure applied to the curved board 2 during towing, as a result of the curved board 2 being curved in the curving direction.

The curved board 2 may be composed of a metal, such as aluminum.

Figure 3:
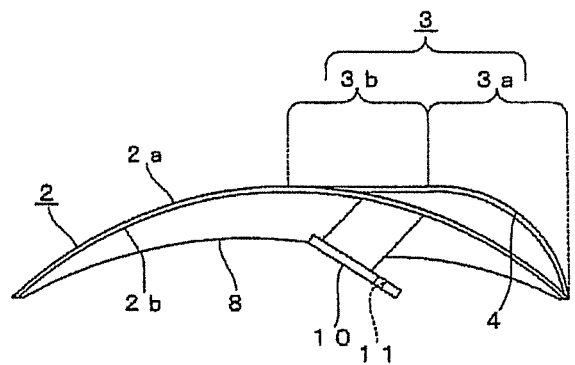
FIG. 3 is a cross-sectional view taken along line A-A in FIG. 1.

As shown in FIG. 3, a projecting structure 4 having a projecting surface 3 is formed on a surface 2a on the curving direction side of the curved board 2 (an upper surface in FIG. 3), over a region of a predetermined area on the front side (right side in FIG. 3) of the surface 2a on the curving direction side, the projecting surface 3 projecting further to the curving direction side than the region.

More specifically, as the region of the predetermined area, the projecting structure 4 is formed in a region from the front-side end section (the right end section in FIG. 3) of the surface 2a on the curving direction side of the curved board 2 to an intermediate position between the front-side end section and the rear-side end section (the left end section in FIG. 3) of the surface 2a on the curving direction side.

A section of the projecting surface 3 in a certain area on the front side (the right side in FIG. 3) is formed into an arc-shaped curved surface 3a such as to curve in a projecting direction (an upper right direction in FIG. 3) from the front-side end section (the right end section in FIG. 3) side of the projecting surface 3 towards the rear-side end section (the left end section in FIG. 3) side of the projecting surface 3. Furthermore, a section of the projecting surface 3 other than the section in the certain area on the front side, or in other words, a section in a certain area on the back side (the left side in FIG. 3) is formed into a flat surface 3b. Still further, the flat surface 3b is formed such that a normal line thereof is parallel with the curving direction of the curved board 2. The location of the boundary between the curved surface 3a and the flat surface 3b can be changed depending on the concept. For example, a position of the rear-side end section of the curved surface 3a in a chord direction (a horizontal direction in FIG. 3) of the curved board 2 may be set such as to be ¼ of the length of the curved board 2 in the chord direction measured from the front-side end section of the curved board 2.

Furthermore, as shown in FIG. 3, the projecting structure 4 is configured by a plate-shaped member having a curved-plate shape fixed onto the region within the predetermined area of the surface 2a on the curving direction side of the curved board 2, via both front and rear end sections thereof. The plate-shaped member may be composed of a metal such as aluminum. In this instance, when the curved board 2 is composed of a metal, the plate-shaped member may be stably fixed to the curved board 2 by welding.

Figure 1:
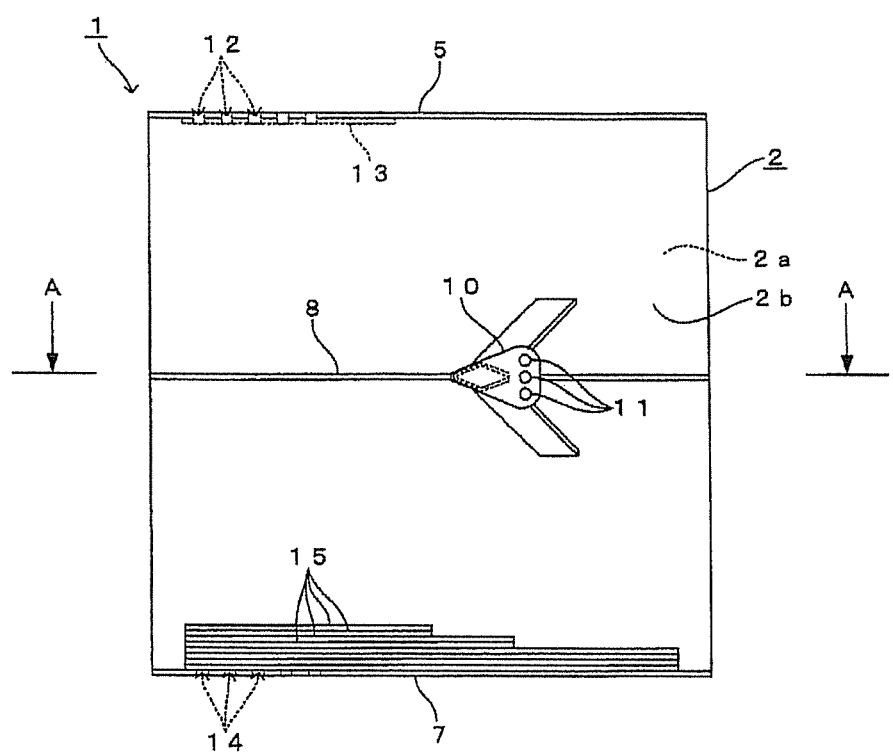
FIG. 1 is a configuration diagram of embodiment of an otter board of the present invention.
Figure 2:
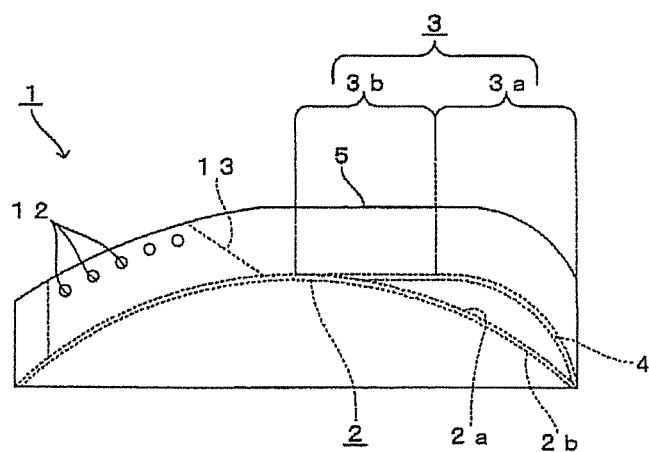
FIG. 2 is a planar view of FIG. 1.

In addition, the dimension in the height direction (a vertical direction in FIG. 1 and a direction perpendicular to the paper on which FIG. 2 is printed) of the projecting structure 4 and the projecting surface 3 may be the same as the dimension in the height direction of the curved board 2, or may be shorter than the dimension in the height direction of the curved board 2.

According to a configuration such as that described above, the vortex generated in the otter board can be sufficiently suppressed by a rectification effect of the projecting structure 4, and the spreading force of the trawl net can be sufficiently improved. In addition, a formation area of the projecting structure 4 can be set to an area suitable for reducing generation of the vortex, and the shape of the projecting surface 3 can be set to a shape suitable for reducing generation of the vortex. Furthermore, the projecting structure can be simply formed.

In addition to the above-described configuration, in the otter board 1 according to the present embodiment, as shown in FIG. 1 and FIG. 2, a plate-shaped top board 5 perpendicular to the curved board 2 is formed in an upper-side end section (an upper end section in FIG. 1, and an end section on the front side of the paper on which FIG. 2 is printed) that is a vertically upward side of the curved board 2 in the towing state. Here, as shown in FIG. 2, the top board 5 is formed such that the overall planar shape is an almost cambered shape, such as to extend outward from the upper-side end section of the curved board 2 in the curving direction (an upward direction in FIG. 2) and a direction opposing the curving direction (a downward direction in FIG. 2).

Furthermore, as shown in FIG. 2, an extension width in the curving direction in the section corresponding to the region in the predetermined area of the top board 5, or in other words, a front half section (a right half section in FIG. 2) of the top board 5 is set to be the same or greater than an extension width in the curving direction in the section other than the section corresponding to the region in the predetermined area in the top board 5, or in other words, a rear half section (a left half section in FIG. 2) of the top board 5. As shown in FIG. 2, the front half section of the top board 5 extends further to the curving direction side than the projecting surface 3 such that the end section on the curving direction side has a shape following the projecting surface 3. In addition, as shown in FIG. 2, the rear half section of the top board 5 is formed such that the end section on the curving direction side has a shape following the rear half section of the surface 2a of the curved board 2. Furthermore, the end section (a lower end section in FIG. 2) of the top board 5 on the side of the direction opposing the curving direction forms a chord of the curved board 2 in FIG. 2. In addition, the top board 5 may be composed of the same material as the curved board 2.

According to a configuration such as that described above, the generation of a vortex can be further reduced by the rectification effect of the top board 5, and the spreading force of the trawl net is further improved.

Figure 4:
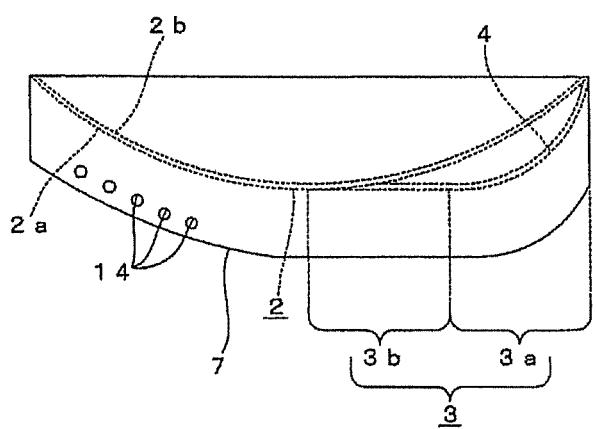
FIG. 4 is a bottom view of FIG. 1.

In addition to the above-described configuration, as shown in FIG. 1 and FIG. 4, in the otter board 1 according to the present invention, a plate-shaped bottom board 7 perpendicular to the curved board 2 is further formed in a lower-side end section (a lower end section in FIG. 1, and an end section on the rear side of the paper on which FIG. 2 is printed) that is a vertically downward side of the curved board 2 in the towing state. Here, the planar shape of the bottom board 7 is the same shape as that of the top board 5 shown in FIG. 1 and FIG. 2.

In other words, the bottom board 7 is formed such that the overall planar shape is an almost cambered shape, such as to extend outward from the lower-side end section of the curved board 2 in the curving direction (a downward direction in FIG. 4) and a direction opposing the curving direction (an upward direction in FIG. 4). Furthermore, as shown in FIG. 4, an extension width in the curving direction in the section corresponding to the region in the predetermined area of the bottom board 7, or in other words, a front half section (a right half section in FIG. 4) of the bottom board 7 is set to be the same or greater than an extension width in the curving direction in the section other than the section corresponding to the region in the predetermined area in the bottom board 7, or in other words, a rear half section (a left half section in FIG. 4) of the bottom board 7. As shown in FIG. 4, the front half section of the bottom board 7 extends further to the curving direction side than the projecting surface 3 such that the end section on the curving direction side has a shape following the projecting surface 3. In addition, as shown in FIG. 4, the rear half section of the bottom board 7 is formed such that the end section on the curving direction side has a shape following the rear half section of the surface 2a of the curved board 2. Furthermore, the end section (a upper end section in FIG. 4) of the bottom board 7 on the side of the direction opposing the curving direction forms a chord of the curved board 2 in FIG. 4. In addition, the bottom board 7 may be composed of the same material as the curved board 2.

The spreading force of the trawl net can be significantly improved by the combined rectifying effects of the projecting structure 4, the top board 5, and the bottom board 7, described above.

As another configuration, as shown in FIG. 1 and FIG. 3, a middle board 8 parallel with the top board 5 and the bottom board 7 is formed such as to extend in the direction opposing the curving direction, on a surface 2b of the curved board 2 on the side in the direction opposing the surface 2a on the curving direction side and in a position slightly higher than the intermediate position between the upper-side end section and the lower-side end section of the curved board 2. As shown in FIG. 3, a plate-shaped warp attaching section 10 is formed in the middle board 8 such as to be perpendicular to the middle board 8 and angled towards the direction opposing the curving direction towards the front side. In the warp attaching section 10, a plurality (three in FIG. 1) of through holes 11 for attaching the warp are formed with a predetermined amount of space therebetween in the vertical direction. The through holes 11 serve as towing points of the otter board 1 during towing. The positions of the through holes 11 in the chord direction of the curved board 2 are preferably positions at 30% to 40% of the length in the chord direction of the curved board 2 (in other words, the overall length of the curved board 2) measured from the front-side end section of the curved board 2.

As shown in FIG. 2, in an edge section on the curving direction side in the rear half section of the top board 5, a plurality (five in FIG. 2) of through holes 12 for attaching an otter pennant are provided with a predetermined amount of space therebetween along the arc of the curved board 2. As shown in FIG. 2, a reinforcement board 13 may be provided on underneath the top board 5, and the through holes 12 may pass through the reinforcement board 13.

Furthermore, as shown in FIG. 4, in an edge section on the curving direction side in the rear half section of the bottom board 7 as well, a plurality (five in FIG. 4) of through holes 14 for attaching the otter pennant are formed with a predetermined amount of space therebetween along the arc of the curved board 2.

Still further, as shown in FIG. 1, on the top surface of the bottom board 7, a plate-shaped weighting steel 15 for sinking the otter board 1 into the ocean is disposed in a detachable manner.

Figure 5:
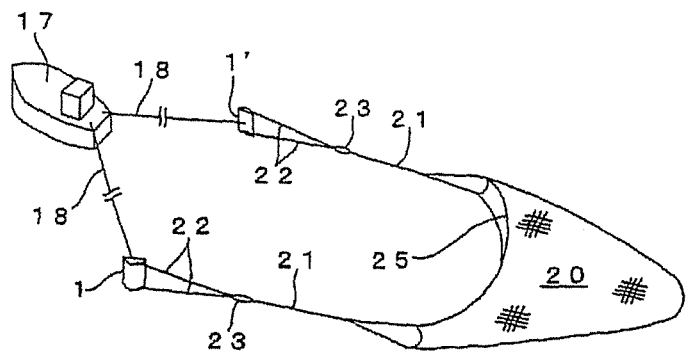
FIG. 5 is a diagram of a towing state of the otter board and a trawl net by a trawler, according to an embodiment of the otter board of the present invention.

As shown in FIG. 5, the above-described otter board 1 according the present embodiment is towed by a trawler 17 in a state in which the otter board 1 is connected to the trawler 17 as a result of a warp 18 set out from the port side of the trawler 17 being attached to the through holes 11, and the otter board 1 being connected to a trawl net 20 as a result of an otter pennant 22 connected to the trawl net 20 being attached to the through holes 12 and 14. As shown in FIG. 5, a hand rope 21 and a relay member 23 composed of a shackle or the like that relays the otter pennant 22 and the hand rope 21 are interposed between the otter pennant 22 and the trawl net 20.

As shown in FIG. 5, during towing, a starboard-side otter board 1' having a shape symmetrical in the up/down direction in FIG. 2 to FIG. 4 to the port-side otter board 1 according to the present embodiment is towed by the trawler 17, in a state in which the otter board 1 is connected to the trawler 17 with the warp 18 set out from the starboard-side therebetween, and is connected to the trawl net 20 with the otter pennant 22, the hand rope 21, and the like therebetween.

As a result of towing by the trawler 17 as described above, the port-side otter board 1 moves in the leftward direction (the direction to the left side when facing the towing direction) that is the expanding direction of the net opening 25 of the trawl net by the port-side otter board 1, thereby expanding the net opening 25 in the leftward direction.

In addition, the starboard-side otter board 1' moves in the rightward direction that is the expanding direction of the net opening 25 of the trawl net by the starboard-side otter board 1', thereby expanding the net opening 25 in the rightward direction.

EXAMPLES

Next, test results of performance evaluation tests conducted on the otter board 1 according to the present embodiment will be described as an example of the present invention.

In the present example, as a model of two types of otter boards of the present invention, a model of the otter board 1 (including all of the projecting structure 4, the top board 5, and the bottom board 7) according to the above-described embodiment, and a model including only the top board 5 and the bottom board 7 were created. Spreading force (lifting force) characteristics of the models were studied, and a comparison test (performance evaluation test) with a conventional otter board was subsequently conducted using the actual otter board 1 according to the above-described embodiment.

Figure 6:
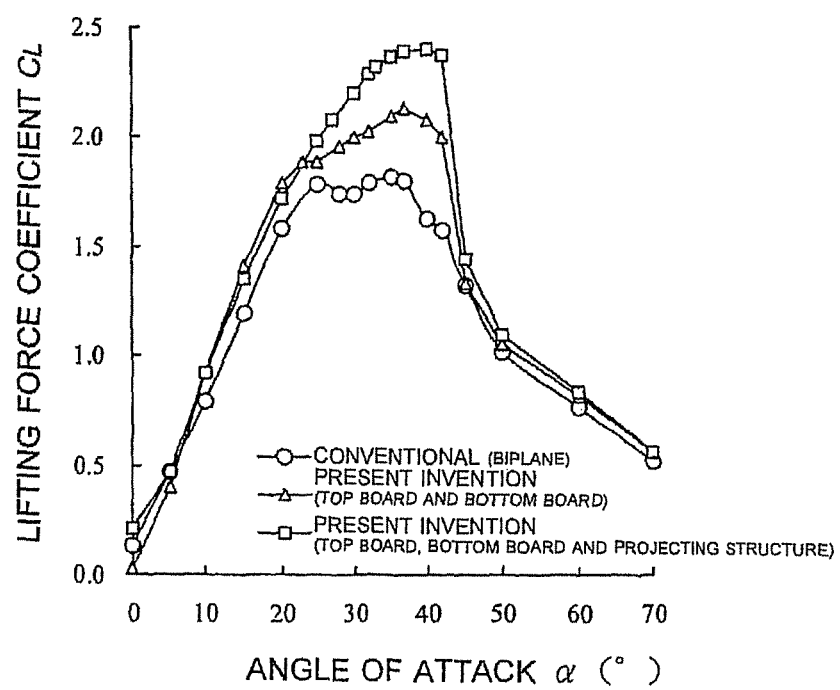
FIG. 6 is a graph showing test results for spreading force characteristics according to the embodiment of the otter board of the present invention.
Figure 7:
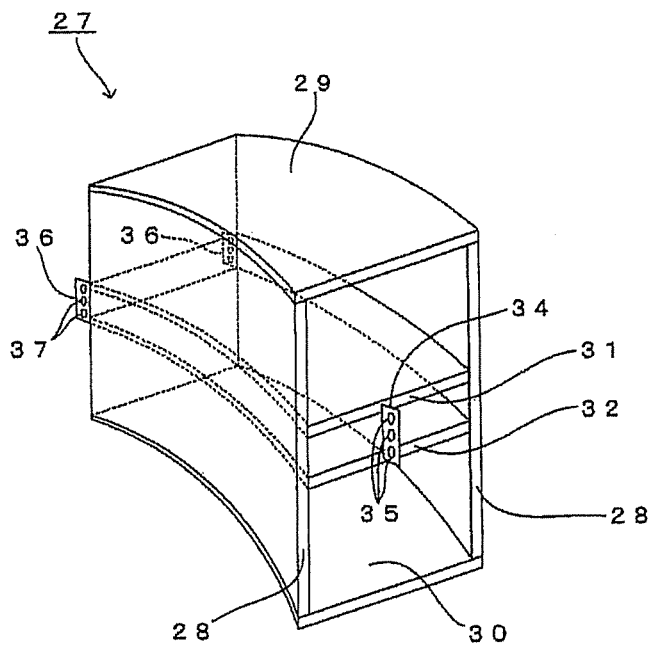
FIG. 7 is a perspective view of an example of a biplane otter board serving as a comparison example according to the embodiment of the otter board of the present invention.

Here, first, in the spreading force characteristics test, in a circulating water tank, the model of the otter board of the present invention was attached to a six-component dynamometer and the lifting force applied to the model in the flowing water was measured. As the results of the spreading force characteristics test, the relationship between an angle of attack (an angle formed with the towing direction) in relation to the flow, and a lifting force coefficient is shown in FIG. 6. In FIG. 6, an example of the test results of the spreading force characteristics test, similar to that conducted on the models of the two types of otter boards of the present invention, conducted on a model of a biplane otter board 27 used since the past, shown in FIG. 7, is also shown.

The spreading force of the otter board is defined as lifting force in a following equation:

$$L = (1/2)CL\rho SV^2 \quad (1)$$

L in Equation (1) indicates spreading force (lifting force) [N]. CL in Equation (1) indicates a lifting force coefficient [dimensionless quantity]. The lifting force coefficient can be considered a unique coefficient of the otter board. Furthermore, $\rho$ in Equation (1) is the density of water [kg/m$^3$]. Still further, S in Equation (1) is a projection area [m$^2$] of the otter board. The projection area S can be considered a value proportional to a surface area of the curved board. V in Equation (1) is a flow rate [m/s]. The flow rate can be considered the same as the towing speed of the otter board by the trawler.

In other words, the spreading force of the trawl net is proportional to the lifting force coefficient and to the area of the curved board.

The lifting force coefficient of the otter board of the present invention indicates a significantly larger value compared to that of a conventional biplane otter board.

In addition, as shown in FIG. 6, the otter board of the present invention is also sufficiently effective when the projecting structure 4 is not provided (when only the top board 5 and the bottom board 7 are provided). Maximum effect can be achieved when the projecting structure 4 is provided in addition to the top board 5 and the bottom board 7.

Next, in the present example, as a comparison test, a performance evaluation test was conducted on the biplane otter board 27 used since the past, shown in FIG. 7, with the otter board 1 according to the present embodiment (including the projecting structure 4, the top board 5, and the bottom board 7), using the actual otter boards, in a manner similar to the above-described spread characteristics test. The otter board 27 in FIG. 7 is a port-side otter board. A starboard-side otter board (not shown) has a shape symmetrical to that shown in FIG. 7.

Here, the otter board 27 shown in FIG. 7 has two curved boards 28 that are disposed facing each other with a predetermined amount of space therebetween in the curving direction. The end sections of the curved boards 28 on the front side of the paper on which FIG. 7 is printed are the front-side end sections that are on the front side in the towing direction in the towing state. The end sections on the rear side of the paper are the rear-side end sections that are on the rear side in the towing direction in the towing state. In addition, in the upper end sections of both curved boards 28 in FIG. 7, a top board 29 having an outer shape following the curved surfaces of both curved boards 28 is fixed. Furthermore, the lower end sections of both curved boards 28 in FIG. 7 are fixed to a bottom board 30 having an outer shape following the curved surfaces of both curved boards 28. Two upper and lower middle boards 31 and 32 are fixed between the curved surfaces of the curved boards 28 that face each other. Furthermore, a plate-shaped warp attaching section 34 is formed in the front end sections of the middle boards 31 and 32. Through holes 35 for attaching the warp 18 (see FIG. 5) are formed in the warp attaching section 34. Still further, a pair of plate-shaped pennant attaching sections 36 are formed in the rear end sections of the middle boards 31 and 32. Through holes 37 for attaching the otter pennant 22 (see FIG. 5) are formed in each pennant attaching section 36. Like the otter board 1 shown in FIG. 5, the otter board 27 of the comparison example, such as that described above, is towed by the trawler 17 in a state in which the otter board 27 is connected to the trawler 17 by the warp 18 set out from the port side of the trawler 17 being attached to the through holes 35, and connected to the trawl net 20 by the otter pennant 22 connected to the trawl net 20 being attached to the through holes 37.

In the present performance evaluation test, the otter board 1 according to the present embodiment and the otter board 27 of the comparison example are both composed of stainless steel.

Furthermore, in the present performance evaluation test, the aspect ratio of the curved board 2 of the otter board 1 according to the present embodiment is 1, the aspect ratio being a value that is the dimension in the height direction (the vertical direction in FIG. 1) of the curved board 2 divided by the height in the chord direction (the horizontal direction in FIG. 1) of the curved board 2. Specifically, the dimension in the height direction and the dimension in the chord direction of the curved board 2 are both 1000 [mm]. The projected area of the curved board 2 of the otter board 1 in the curved direction is 1.0 [m²]. The position of the rear-side end section of the curved surface 3a of the projecting surface 3 in the chord direction of the curved board 2 is set to a position ¼ of the length of the curved board 2 in the chord direction measured from the front-side end section of the curved board 2. Furthermore, the position of the through hole 11 in the chord direction of the curved board 2 regarding is set to a position that is 325 [mm] from the front-side end section of the curved board 2.

In the present performance evaluation test, the aspect ratios of the two curved boards 28 in the otter board 27 of the comparison example are both 2. Specifically, regarding both curved boards 28, the dimension in the height direction is 1200 [mm] and the dimension in the chord direction is 600 [mm]. The sum of the projected areas in the curving direction of both curve boards 28 of the otter board 27 is 1.44 [m²].

Next, detailed content of the present performance evaluation test will be described. In the present example, the performance evaluation test was conducted to examine a relationship between a towing speed [knot] when the otter board 1 is towed together with the trawl net 20 as shown in FIG. 5 (similarly applies to the otter board 27 of the comparison example), and a distance (referred to hereinafter as an otter board spacing) [m] in the left/right direction between the two otter boards 1 and 1' on the port side and the starboard side.

In the performance evaluation test, the length of the warp 18 was 100 [m] and the diameter of the warp 18 was 12 [mm].

Figure 8:
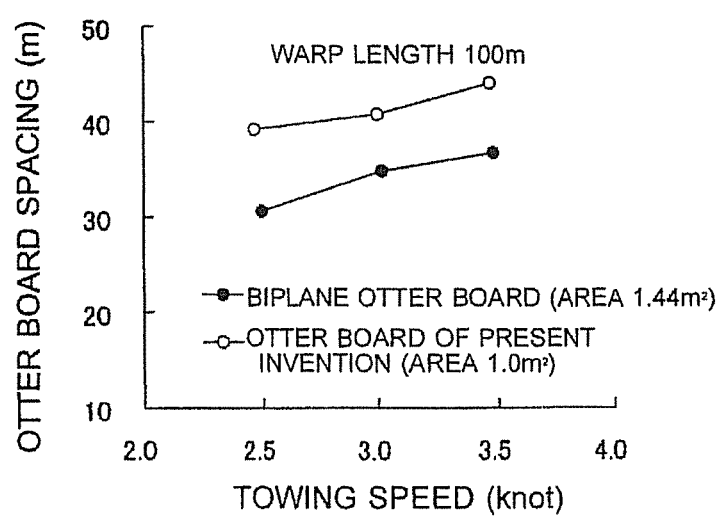
FIG. 8 is a graph showing test results of a performance evaluation test according to the embodiment of the otter board of the present invention.

Next, the test results of the performance evaluation test are shown in FIG. 8.

As shown in FIG. 8, the value of the otter board spacing corresponding to the towing speed is clearly greater in the otter board 1 according to the present embodiment, compared to the otter board 27 of the comparison example. Here, because the net opening 25 of the trawl net 20 more easily expands in the left/right direction as the value of the otter board spacing increases, the spreading force of the otter board 1 according to the present embodiment is greater than that of the otter board 27 of the comparison example. Therefore, the otter board 1 according to the present embodiment can be considered suitable for spreading the trawl net 20. In general, the biplane otter board is more suitable for net-spreading than an otter board with a single curved board. However, better results in the performance evaluation test were achieved with the otter board 1 according to the present embodiment than the biplane otter board 27 such as this because, presumably, the otter board 1 according to the present embodiment sufficiently suppresses generation of a separation vortex as a result of the projecting surface 3, and realizes combined effects of the top board 5 and the bottom board 7.

Here, the otter board 1 according to the present embodiment is known to have a lifting force coefficient that is 1.6 times that of a conventional otter board that is the otter board 1 from which the projecting structure 4, the top board 5, and the bottom board 7 have been removed. This indicates that the area of the curve board of the otter board required to achieve a predetermined spreading force can be reduced in the otter board 1 according to the present embodiment, from that of the conventional otter board.

Therefore, according to the present embodiment, in addition to the improvement in spreading force, the otter board can be made compact. Moreover, operation of fishing gear on the deck of the trawler is facilitated, enabling more efficient operation and reducing manpower and labor, thereby contributing to improvement in fishery management. In addition, the otter board can be manufactured at a low cost because raw materials of the otter board are reduced, thereby reducing cost.

The present invention is not limited to a configuration such as that described above, and various modifications can be made as required.

For example, the otter board 1 according to the above-described embodiment includes all of the projecting structure 4, the top board 5, and the bottom board 7. However, the present invention is not limited to a configuration such as this, and is merely required to include at least one of the projecting structure 4, the top board 5, and the bottom board 7. For example, as shown in FIG. 6, only the top board 5 and the bottom board 7 may be included. Alternatively, only the projecting structure 4 may be included.

The invention claimed is:

1. An otter board that expands a net opening of a trawl net by being towed together with the trawl net by a trawler in a state in which the otter board is connected to the trawler and the trawl net, the otter board comprising:
   a curved board that is formed into a shape curving in a curving direction corresponding to an expanding direction of the net opening from a front-side end section that is a front side in a towing direction in a towing state towards a rear-side end section that is a rear side in the towing direction in the towing state, and that moves in the expanding direction of the net opening in accompaniment with towing by the trawler, wherein
   the otter board further includes
   a top board formed in an upper-side end section that is a vertical upper side of the curved board in the towing state, in order for the top board to extend in relation to the upper-side end section in the curving direction and a direction opposing the curving direction of which end section on the side of the direction opposing the curving direction forms a chord of the curved board, and
   a bottom board formed in a lower-side end section that is a vertical lower side of the curved board in the towing state, in order for the bottom board to extend in relation to the lower-side end section in the curving direction and a direction opposing the curving direction of which end section on the side of the direction opposing the curving direction forms a chord of the curved board.

2. The otter board according to claim 1, wherein the bottom board is formed into a same shape as the top board.

3. The otter board according to claim 1, wherein the top board extends in relation to the whole upper-side end section in the curving direction of the curved board, and the bottom board extends in relation to the whole lower-side end section in the curving direction of the curve board.

4. The otter board according to claim 2, wherein the top board extends in relation to the whole upper-side end section in the curving direction of the curved board, and the bottom board extends in relation to the whole lower-side end section in the curving direction of the curved board.

* * * * *